United States Patent Office 2,920,353
Patented Jan. 12, 1960

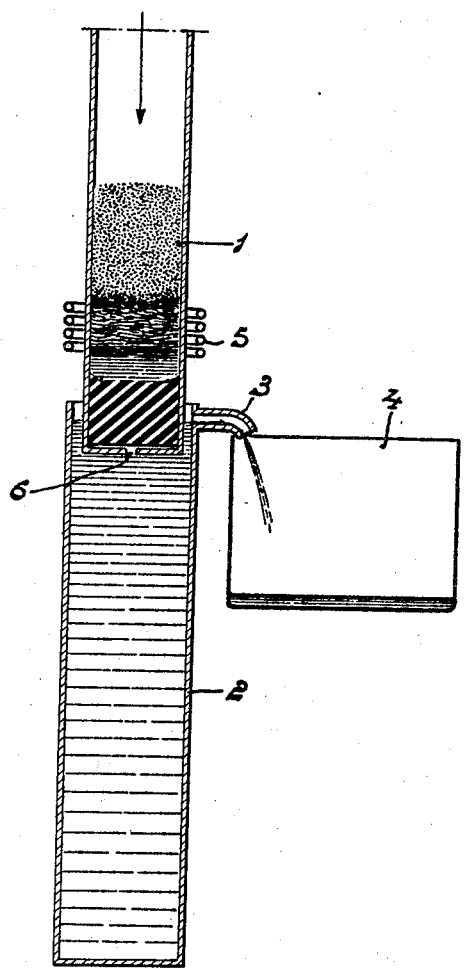

2,920,353
METHOD OF MANUFACTURING MOULDINGS

Herman Jan Strating and Friederich Joannes Janssen, Eindhoven, Netherlands, assignors, by mesne assignments, to North American Philips Company, Inc., New York, N.Y., a corporation of Delaware Application July 20, 1955, Serial No. 523,146

Claims priority, application Netherlands August 6, 1954

3 Claims. (Cl. 18—58)

The invention relates to a method of manufacturing mouldings from polyethylene and similar thermoplastic synthetic resins, more particularly large elongated mouldings, such as rods, profiles and the like.

As is well known such mouldings are manufactured by extrusion, which requires expensive apparatus. However, serious difficulties are met in producing, for example, round rods the diameter of which exceeds 5 cm., since this requires a very high pressure.

According to the method in accordance with the invention such mouldings are produced by causing liquid synthetic resin containing no gas to solidify in a mould, solidification being caused to start at the bottom of the mould where this mould, at least after solidification has started, communicates with a tank containing a liquid, such as water, which does not act upon the synthetic resin, the level of which liquid is higher than the base of the moulding.

The invention will be described with reference to the accompanying drawing the sole figure of which shows an apparatus for carrying out the method according to the invention at a certain stage during the formation of a rod of polyethylene.

In the single figure reference numeral 1 designates a tube in which a rod has already partly been formed, the initial material being finely powdered polyethylene.

Reference numeral 2 designates another tube the diameter of which is larger than that of tube 1 so that tube 1 fits within tube 2 with a certain amount of clearance.

The tube 2 is filled with water which, when the tube 1 is lowered in the tube 2, runs over via a pipe 3 into a tank 4. The tubes 1 and 2 may be made of glass, metal and the like. Reference numeral 5 designates a cross section of the annular heating element. The heating element 5 and the tube 2 are stationary.

At the beginning of the process the tube 1 is filled entirely or in part with finely powdered polyethylene and arranged such that the lower end of the tube 1 is disposed within the heating range of the element 5. After the polyethylene contained in said lower end of the tube 1 has been liquified and the air has escaped, the tube 1 is slightly lowered so that the polyethylene arranged above it is heated. Thus, a thin jet of polyethylene flows from an aperture 6 but solidifies after the tube 1 has been lowered. When a thin layer of solid polyethylene has been produced at the bottom of the tube 1, the aperture 6 is opened, usually by breaking off the adhering thread of solidified polyethylene. The tube 1 is then lowered further after the polyethylene disposed within the heating range of the element 5 has been liquified and the occluded gas bubbles have been removed. The aperture 6 is submerged in the water contained in the tube 2, so that the clear space produced due to the contraction of solidified polyethylene is filled with water. This stage of the method is shown in the figure.

When the tube 1 is further lowered in the tube 2, the lower end of the rod is supported by the pressure which the water exerts upon the lower end of the rod. This ensures that the contraction of the solid polyethylene does not result in that the weight of the polyethylene already solidified and the atmospheric pressure on the surface of the liquid polyethylene must be supported by the adhesion to the wall of the mould of polyethylene which is still hot and consequently slightly soft and is disposed as a comparatively thin layer immediately under the liquified layer, which might give rise to cracks being produced in the moulding.

However, the invention is not limited to this preferred embodiment of the method but also comprises obvious modifications.

As examples, we may mention the introduction of liquid polyethylene into the tube 1 and the use of a liquid which does not act upon polyethylene other than water, such as, for example, glycerol and amyl alcohol.

The tube 1 may also be shaped into a different form, for example the form of a tube or a profile.

Closing the aperture 6 mechanically at the beginning of the process also comes within the scope of the invention, in which event this aperture is made larger.

The invention also comprises the production of such mouldings from thermoplastic synthetic resins other than polyethylene which may be sufficiently liquified, without the occurrence of decomposition, by heating or by adding liquids reducing the viscosity, it may be after the liquid synthetic resin has been passed through an evacuated space in order to assist the removal of the occluded gas bubbles.

It has been found that many high polymeric thermoplastic synthetic resins, such as high polymeric polyamides, polystyrols, polyacryl acetic esters at the highest working temperature which is admissible in view of the occurrence of decomposition are not sufficiently liquid for the escape of the occluded gas bubbles to be readily effected. By the use of de-gassing this disadvantage can be slightly mitigated.

It was found that the above-described preferred embodiment of the invention was suitable for polyethylene having a mean molecular weight up to approximately 50,000. When polyethylene having a higher molecular weight is used, the removal of the gas bubbles presents difficulty.

When using the method in accordance with the invention the length of the rods to be produced is only limited by the possibility of handling the long moulds. However, rods and profiles from 1 to 2 m. long can be produced without difficulty. The diameter of the rods and profiles may be 35 to 40 cm.

What is claimed is:

1. A method of manufacturing moldings from a high polymeric thermoplastic synthetic resin, comprising providing a liquid high polymeric thermoplastic synthetic resin containing substantially no gas in a mold having a relatively small initially closed aperture at the bottom, immersing said mold gradually in a liquid which is non-reactive with said resin in a manner whereby said resin is caused to gradually solidify from the bottom of said mold upwards, opening said aperture to permit said liquid to enter spaces between said solidified resin and said mold, and maintaining said liquid at a level relatively higher than said bottom of said mold.

2. A method of manufacturing moldings from a high polymeric thermoplastic synthetic resin, comprising providing a powdered high polymeric thermoplastic synthetic resin in a mold having a relatively small initially closed aperture at the bottom, heating the bottom portion of said mold in a manner whereby the bottom portion of said resin is liquified and contains substantially no gas, immersing said mold gradually in a liquid which is non-reactive with said resin in a manner whereby said resin is caused to gradually solidify from the bottom of said mold upwards, opening said aperture to permit said liquid to enter spaces between said solidified resin and said mold, and maintaining said liquid at a level relatively higher than said bottom of said mold.

3. A method of manufacturing moldings from a high polymeric thermoplastic synthetic resin, comprising providing a powdered high polymeric thermoplastic synthetic resin in a mold having a relatively small initially closed aperture at the bottom, heating the bottom portion of said mold in a manner whereby the bottom portion of said resin is liquified and contains substantially no gas, immersing said mold gradually in a liquid which is non-reactive with said resin in a manner whereby said resin is caused to gradually solidify from the bottom of said mold upwards, opening said aperture to permit said liquid to enter spaces between said solidified resin and said mold, maintaining said liquid at a level relatively higher than said bottom of said mold, and conducting away overflow liquid.

References Cited in the file of this patent

UNITED STATES PATENTS

| | | |
|---|---|---|
| 1,678,108 | Deutsch et al. | July 24, 1928 |
| 2,057,674 | Fields | Oct. 20, 1936 |
| 2,136,423 | Fields et al. | Nov. 15, 1938 |
| 2,136,425 | Fields | Nov. 15, 1938 |
| 2,168,331 | Fields et al. | Aug. 8, 1939 |
| 2,215,733 | Gibb et al. | Sept. 24, 1940 |
| 2,305,362 | Taylor | Dec. 15, 1942 |
| 2,485,798 | Whyte et al. | Oct. 25, 1949 |
| 2,505,807 | Stott | May 2, 1950 |
| 2,735,138 | Luehm et al. | Feb. 21, 1956 |